(12) United States Patent
Eastman et al.

(10) Patent No.: US 10,669,127 B2
(45) Date of Patent: Jun. 2, 2020

(54) HYBRID FABRIC-LAMINATED BELT FOR ELEVATOR SYSTEM

(71) Applicant: Otis Elevator Company, Farmington, CT (US)

(72) Inventors: Scott Alan Eastman, Glastonbury, CT (US); Daniel A. Mosher, Glastonbury, CT (US); Michael Paul Humbert, Wethersfield, CT (US); Steven W. Gronda, Feeding Hills, MA (US); Wenping Zhao, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 78 days.

(21) Appl. No.: 15/839,206

(22) Filed: Dec. 12, 2017

(65) Prior Publication Data

US 2018/0162695 A1 Jun. 14, 2018

Related U.S. Application Data

(60) Provisional application No. 62/432,796, filed on Dec. 12, 2016.

(51) Int. Cl.
*B66B 7/06* (2006.01)
*B66B 7/10* (2006.01)
(Continued)

(52) U.S. Cl.
CPC .............. *B66B 7/062* (2013.01); *B32B 5/022* (2013.01); *B32B 5/024* (2013.01); *B32B 5/026* (2013.01);
(Continued)

(58) Field of Classification Search
None
See application file for complete search history.

(56) References Cited

U.S. PATENT DOCUMENTS

| 3,297,513 A | 1/1967 | Robinson |
| 5,584,897 A | 12/1996 | Christianson et al. |
| (Continued) | | |

FOREIGN PATENT DOCUMENTS

| CN | 1946647 A | 4/2007 |
| CN | 103879710 A | 6/2014 |
| (Continued) | | |

OTHER PUBLICATIONS

European Search Report Issued in EP Application No. 17206624.3, dated Apr. 16, 2018, 9 Pages.

*Primary Examiner* — Shawn Mckinnon
(74) *Attorney, Agent, or Firm* — Cantor Colburn LLP

(57) ABSTRACT

A traction-driven belt for moving a load includes a plurality of tension elements extending longitudinally along a length of the belt, and a plurality of yarns interlaced with the plurality of tension elements forming a composite belt structure. A laminate material layer is affixed to at least one surface of the composite belt structure to improve one or more performance properties of the composite belt structure. A belt for suspending and/or driving an elevator car includes a plurality of tension elements extending longitudinally along a length of the belt, and a plurality of yarns interlaced with the plurality of tension elements forming a composite belt structure. A sheath encloses at least one tension element of the plurality of tension elements. The sheath is formed from a flowable material to bind the tension element to the plurality of yarns, and/or adjacent tension elements.

15 Claims, 5 Drawing Sheets

(51) Int. Cl.
  *B32B 27/12* (2006.01)
  *B32B 27/36* (2006.01)
  *B32B 27/30* (2006.01)
  *B32B 5/02* (2006.01)
  *B32B 5/26* (2006.01)
  *B32B 27/38* (2006.01)
  *B32B 5/24* (2006.01)
  *B32B 5/28* (2006.01)
  *B32B 27/28* (2006.01)
  *B32B 5/08* (2006.01)
  *B32B 27/08* (2006.01)

(52) U.S. Cl.
  CPC .................. *B32B 5/08* (2013.01); *B32B 5/24* (2013.01); *B32B 5/26* (2013.01); *B32B 5/28* (2013.01); *B32B 27/08* (2013.01); *B32B 27/12* (2013.01); *B32B 27/285* (2013.01); *B32B 27/288* (2013.01); *B32B 27/30* (2013.01); *B32B 27/308* (2013.01); *B32B 27/36* (2013.01); *B32B 27/365* (2013.01); *B32B 27/38* (2013.01); *B66B 7/10* (2013.01); *B32B 2260/021* (2013.01); *B32B 2260/046* (2013.01); *B32B 2262/02* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/08* (2013.01); *B32B 2262/101* (2013.01); *B32B 2262/103* (2013.01); *B32B 2262/106* (2013.01); *B32B 2307/102* (2013.01); *B32B 2307/50* (2013.01); *B32B 2433/00* (2013.01); *B32B 2433/02* (2013.01); *B32B 2433/04* (2013.01); *B32B 2605/00* (2013.01)

(56) References Cited

U.S. PATENT DOCUMENTS

| | | |
|---|---|---|
| 5,830,248 A | 11/1998 | Christianson et al. |
| 6,572,505 B1 | 6/2003 | Knutson |
| 6,868,661 B2 | 3/2005 | Aulanko et al. |
| 7,128,674 B2 | 10/2006 | Teves et al. |
| 8,052,820 B2 | 11/2011 | O'Donnell et al. |
| 8,568,260 B2 | 10/2013 | Baldovino et al. |
| 8,673,433 B2 | 3/2014 | Reif et al. |
| 8,677,726 B2 | 3/2014 | Wesson et al. |
| 9,115,466 B2 | 8/2015 | Wesson et al. |
| 9,341,232 B2 | 5/2016 | Wu et al. |
| 2012/0329591 A1 | 12/2012 | Goeser et al. |
| 2015/0259176 A1 | 9/2015 | Goeser et al. |

FOREIGN PATENT DOCUMENTS

| | | |
|---|---|---|
| EP | 0228725 A1 | 7/1987 |
| EP | 0753471 B1 | 5/2003 |
| EP | 1886795 A1 | 2/2008 |
| EP | 3205617 A1 | 8/2017 |
| WO | 0129299 A2 | 4/2001 |
| WO | 2011142756 A1 | 11/2011 |
| WO | 2013105958 A1 | 7/2013 |
| WO | 2015126359 A1 | 8/2015 |
| WO | 2015134023 A1 | 9/2015 |

HYBRID FABRIC-LAMINATED BELT FOR ELEVATOR SYSTEM

BACKGROUND

The subject matter disclosed herein relates to tension members such as those used in elevator systems for suspension and/or driving of the elevator car and/or counterweight.

Traction-driven belts typically include steel cord tension members that are encased in a polymer jacket that serves to maintain the proper cord spacing while preventing slippage of the cords during operation. The polymer jacket, typically an extrudable thermoplastic urethane, has a multitude of performance and manufacturing challenges. Friction, fire resistance, corrosion resistance, and other properties may need to be engineered into the jacket through the use of different polymers and additives. In order to provide the many necessary properties, there are often issues with material compatibility, mixing, settling, and other processing concerns. Further, extrusion profiles, temperatures, and production rates are all affected by these and can affect scrap rate. Such traction-driven belts may be utilized in elevator systems and other applications, such as grain elevators, hoisting and strapping applications and moving walkway systems.

Utilizing a composite type of construction, where the tension members are held in place by a yarn and a coating package or packages are then applied to the yarn and tension member assembly, can enable a construction that provides the necessary properties while mitigating some of the manufacturing challenges associated with a polymer extrusion process. Further, the use of low cost yarns and inexpensive coatings can result in a lower cost belt material. In order to maintain a low cost product, however, the yarn application process needs to use low cost materials and processes and the production rate needs to be quite fast. For this reason, commonly used processes such as knitting and weaving must be used. Further, the weft yarn spacing needs to be large enough to enable fast production to mitigate cost. This effectively limits the amount of yarn that can be used, which in turn limits the thickness and density of the belt. Wear resistance often becomes a limiting property of this type of construction in comparison to a polymer jacket structure.

SUMMARY

In one embodiment, traction-driven belt for movement of a load includes a plurality of tension elements extending longitudinally along a length of the belt, and a plurality of yarns interlaced with the plurality of tension elements forming a composite belt structure. A laminate material layer is affixed to at least one surface of the composite belt structure to improve one or more performance properties of the composite belt structure.

Additionally or alternatively, in this or other embodiments a binder layer is interposed between the laminate material layer and the at least one surface to adhere the laminate material layer to the at least one surface.

Additionally or alternatively, in this or other embodiments the binder layer includes one or more of a thermoplastic urethane, a hot melt adhesive, a two-part urethane or a contact cement.

Additionally or alternatively, in this or other embodiments one or more of the plurality of yarns include a fusible material to bind the laminate material layer to the composite belt structure.

Additionally or alternatively, in this or other embodiments the yarns include a first yarn material which is fusible and a second yarn material which is not fusible.

Additionally or alternatively, in this or other embodiments at least one of the tension elements is enclosed in a sheath.

Additionally or alternatively, in this or other embodiments the sheath is formed from a flowable material to bind the tension element to the plurality of yarns, the laminate material layer and/or adjacent tension elements.

Additionally or alternatively, in this or other embodiments a first tension element is enclosed in a first sheath formed from a first sheath material, and a second tension element is enclosed in a second sheath formed from a second sheath material different from the first sheath material.

Additionally or alternatively, in this or other embodiments the laminate material layer includes one or more of a woven or nonwoven fabric, a polymer film, a polymer-infiltrated fabric, or a carbon fiber composite.

Additionally or alternatively, in this or other embodiments the laminate material layer is affixed to a traction side of the composite belt structure.

Additionally or alternatively, in this or other embodiments the one or more performance properties includes traction, wear resistance or noise resistance.

In another embodiment, a traction-driven belt for movement of a load includes a plurality of tension elements extending longitudinally along a length of the belt, and a plurality of yarns interlaced with the plurality of tension elements forming a composite belt structure. A sheath encloses at least one tension element of the plurality of tension elements. The sheath is formed from a flowable material to bind the tension element to the plurality of yarns, and/or adjacent tension elements.

Additionally or alternatively, in this or other embodiments a first tension element is enclosed in a first sheath formed from a first sheath material, and a second tension element is enclosed in a second sheath formed from a second sheath material different from the first sheath material.

Additionally or alternatively, in this or other embodiments the sheath is configured to improve one or more of wear resistance, noise resistance, traction or fire performance of the belt.

Additionally or alternatively, in this or other embodiments a laminate material layer is affixed to at least one surface of the composite belt structure to improve one or more performance properties of the composite belt structure.

Additionally or alternatively, in this or other embodiments a binder layer is interposed between the laminate material layer and the at least one surface to adhere the laminate material layer to the at least one surface.

Additionally or alternatively, in this or other embodiments the laminate material layer includes one or more of a woven or nonwoven fabric, a polymer film, a polymer-infiltrated fabric, or a carbon fiber composite.

Additionally or alternatively, in this or other embodiments the laminate material layer is affixed to a traction side of the composite belt structure.

Additionally or alternatively, in this or other embodiments one or more of the plurality of yarns include a fusible material to improve adhesion in the belt.

Additionally or alternatively, in this or other embodiments the yarns include a first yarn material which is fusible and a second yarn material which is not fusible.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
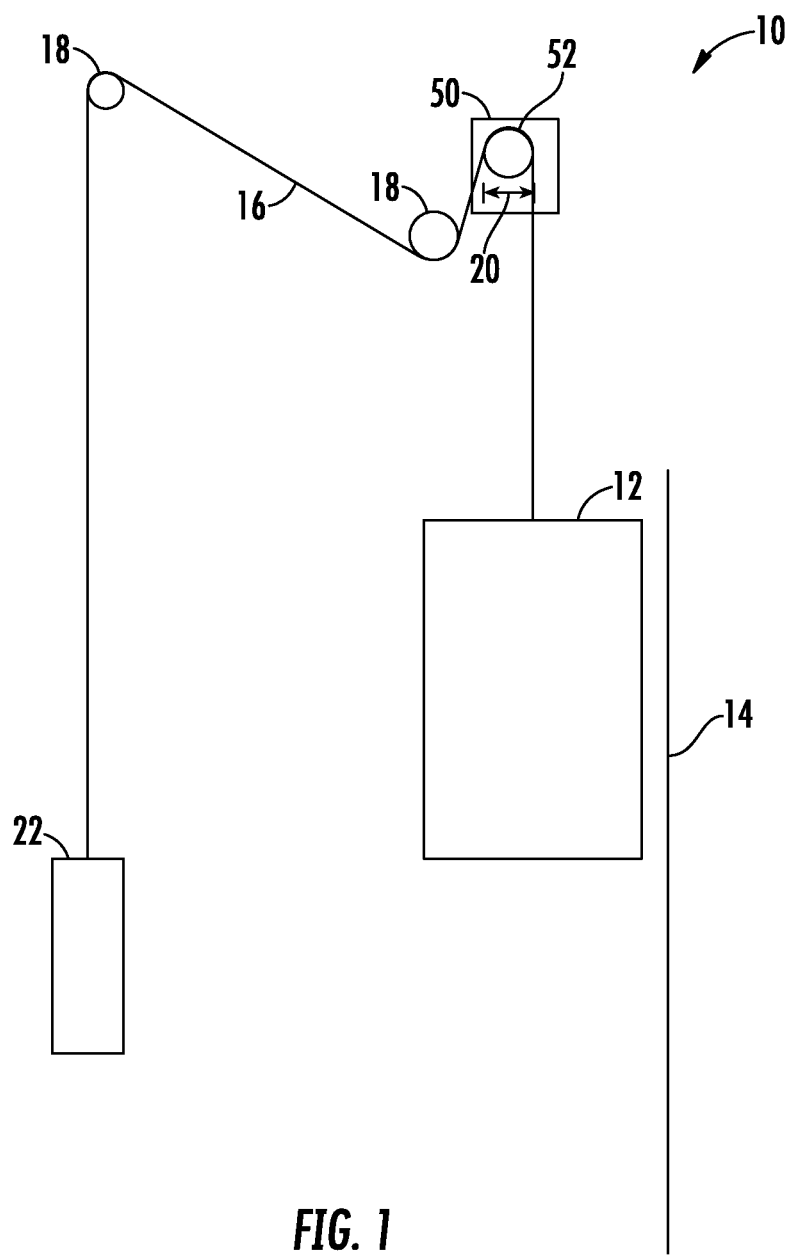
FIG. 1 is a schematic view of an exemplary elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves could be a traction sheave 52. The traction sheave 52 is driven by a machine 50. Movement of drive sheave by the machine 50 drives, moves and/or propels (through traction) the one or more belts 16 that are routed around the traction sheave 52. At least one of the sheaves 18 could be a diverter, deflector or idler sheave. Diverter, deflector or idler sheaves are not driven by a machine 50, but help guide the one or more belts 16 around the various components of the elevator system 10.

In some embodiments, the elevator system 10 could use two or more belts 16 for suspending and/or driving the elevator car 12. In addition, the elevator system 10 could have various configurations such that either both sides of the one or more belts 16 engage the one or more sheaves 18 or only one side of the one or more belts 16 engages the one or more sheaves 18. The embodiment of FIG. 1 shows a 1:1 roping arrangement in which the one or more belts 16 terminate at the car 12 and counterweight 22, while other embodiments may utilize other roping arrangements.

The belts 16 are constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12.

Figure 2:
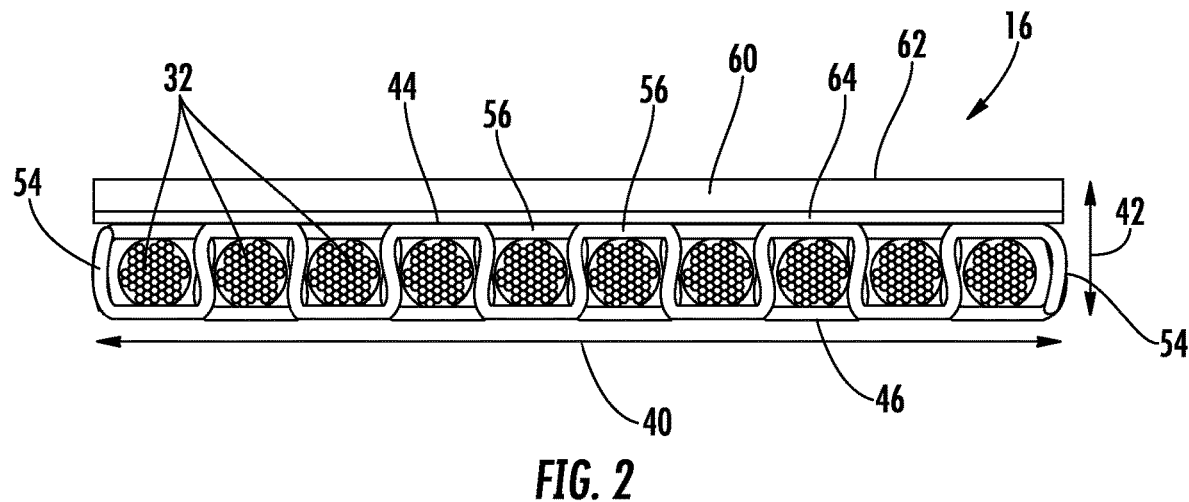
FIG. 2 is a plan view of an embodiment of an elevator belt.

FIG. 2 provides a cross-sectional schematic of an exemplary belt 16 construction or design. The belt 16 includes a plurality of tension elements 32 extending longitudinally along the belt 16. The belt 16 has a belt width 40 and a belt thickness 42, with an aspect ratio of belt width 40 to belt thickness 42 greater than one. The belt 16 defines a traction side 44, which is interactive with the traction sheave 52 and a back side 46 opposite the traction side 44. The belt 16 further defines belt edges 54 extending between the traction side 44 and the back side 46.

Figure 3:
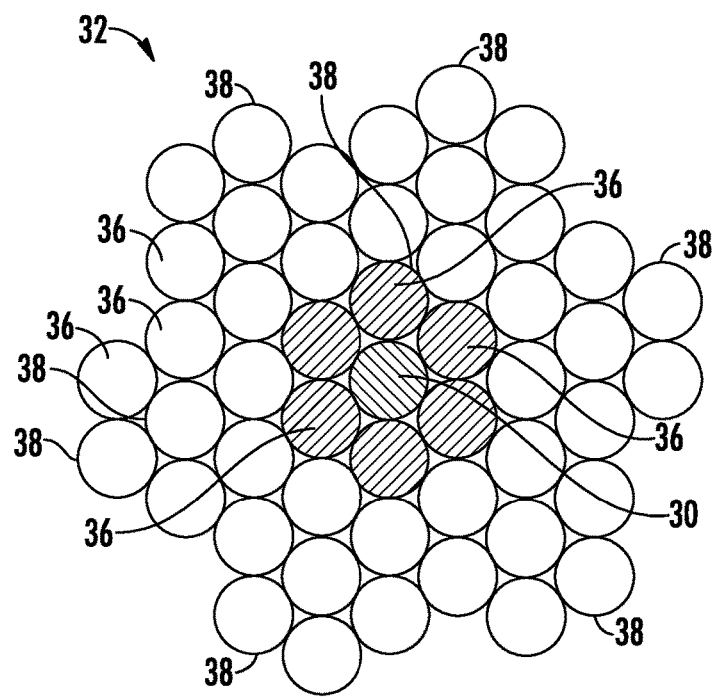
FIG. 3 is a cross-sectional view of an embodiment of a tension element of an elevator belt.

As shown in FIG. 3, in some embodiments, the tension elements 32 are cords formed from a plurality of steel wires 36, which may be arranged into strands 38. Referring again to FIG. 2, the tension elements 32 are arranged generally parallel to each other and extend in a longitudinal direction that establishes a length of the belt 16. While ten tension elements 32 are illustrated in the embodiment of FIG. 2, other embodiments may include other numbers of tension elements 32, for example, 6, 8 or 12 tension elements 32. Further, while the tension elements 32 of the embodiment of FIG. 2 are substantially identical, in other embodiments, the tension elements 32 may differ from one another in number of wires 36, materials or arrangement.

The tension elements 32 are woven, knitted or braided with one or more types of yarns 56 to form a composite belt 16. In one embodiment, shown in FIG. 2, the tension elements 32, and yarns 56 are interlaced into a woven structure. In some embodiments, the yarns 56 include weft yarns and warp yarns substantially perpendicular to the weft yarns. It is to be appreciated that other angles and other methods of interlacing the tension elements 32 with the yarns 56 may be utilized in forming the belt 16. These methods include, but are not limited to, knitting and braiding. In some embodiments, more than one of the above methods may be utilized to form the belt 16. In some embodiments, the yarns 56 are formed from one or more of Nylon, polyester, polyethylene, polyethylene terephthalate, polyether ether ketone, glass, Kevlar, aramid, carbon fiber, wool, or other materials capable of being fabricated into a fiber or yarn. These yarns 56 can be filled or treated to tailor their properties to achieve greater traction, fire resistance, corrosion resistance and mechanical performance. It is to be appreciated that those materials listed are merely exemplary and other fiber materials may be utilized.

Figure 4:
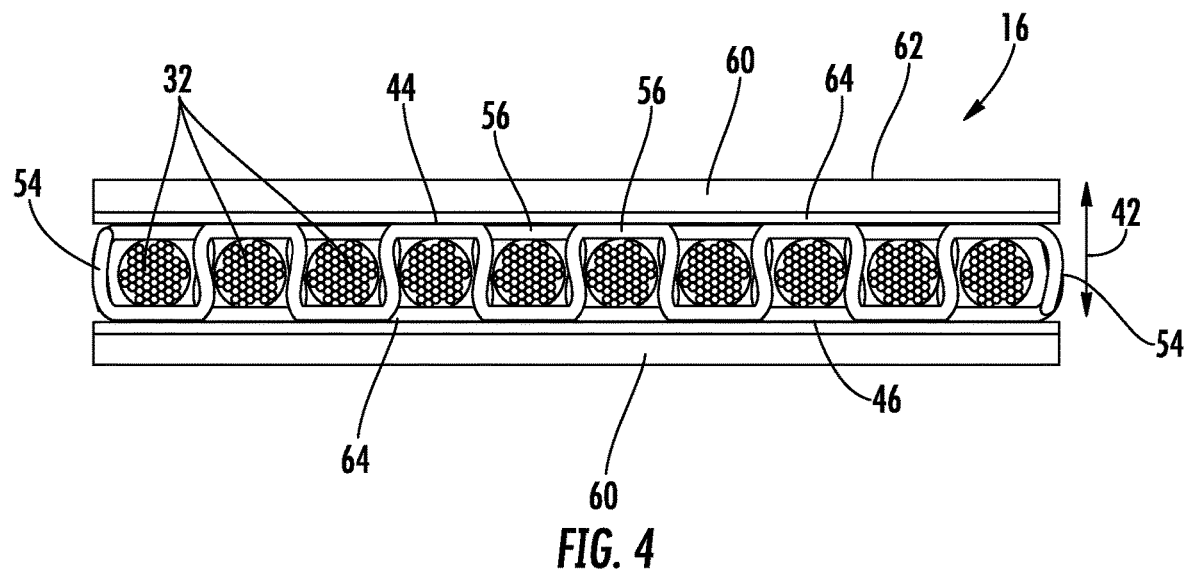
FIG. 4 is a cross-sectional view of an embodiment of an elevator belt having multiple laminate layers.

Referring again to FIG. 2, to improve wear resistance and/or other properties of the belt 16, it is desired to affix one or more laminate material layers 60 of fabric, polymer, or some other material to the face of the composite belt 16. The laminate material layers 60 can be, for example, a woven or nonwoven fabric, a polymer film, a polymer-infiltrated fabric, a carbon fiber composite, or the like. The one or more laminate material layers 60 may be applied to traction side 44 to define a traction surface 62 interactive with the traction sheave 52 with desired properties for traction, wear resistance, noise resistance, or the like. Further, laminate material layers 60 may be applied to the back side 46 and/or belt edges 54 to provide desired belt 16 properties at those locations, as shown in FIG. 4.

In some embodiments, such as shown in FIG. 2, a binder layer 64 is affixed to the traction side 44 of the belt 16, and the laminate material layers 60 are affixed via the binder layer 64. The binder layer 64 and the laminate material layers 60 may be applied utilizing a thin film lamination process. The binder layer 64 is selected to demonstrate desired mechanical properties and adhesion strength. The binder layer 64 may be a thermoplastic material, and in some embodiments, is a thermoplastic urethane, a hot melt adhesive, or other thermoplastic material of material that can be made to flow controllably. In other embodiments, reactive or curable adhesives such as two-part urethanes, contact cements, epoxies or other materials may be utilized for binder layer 64.

Figure 5:
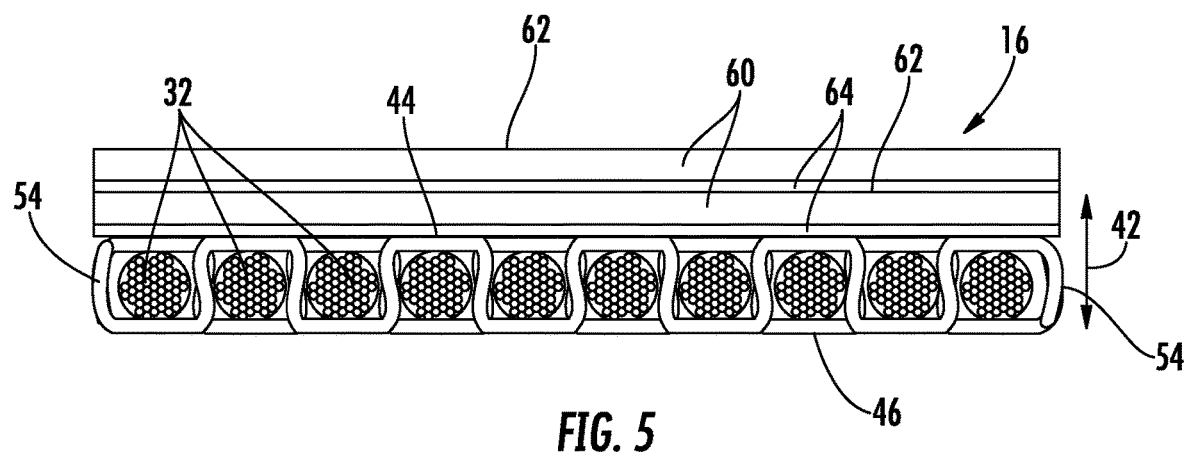
FIG. 5 is a cross-sectional view of another embodiment of an elevator belt having multiple laminate layers.

Referring now to FIG. 5, in embodiments where multiple laminate material layers 60 are applied, a binder layer 64 may be utilized between adjacent laminate material layers 60. In embodiments having multiple laminate material layers 60, each laminate material layer 60 may be the same material or may be different materials. Further, in some embodiments a first laminate material layer 60 may be utilized at, for example, the traction side 44 while a second, different laminate material layer 60 may be utilized at the back side 46 and/or at the belt edges 54.

Figure 6:
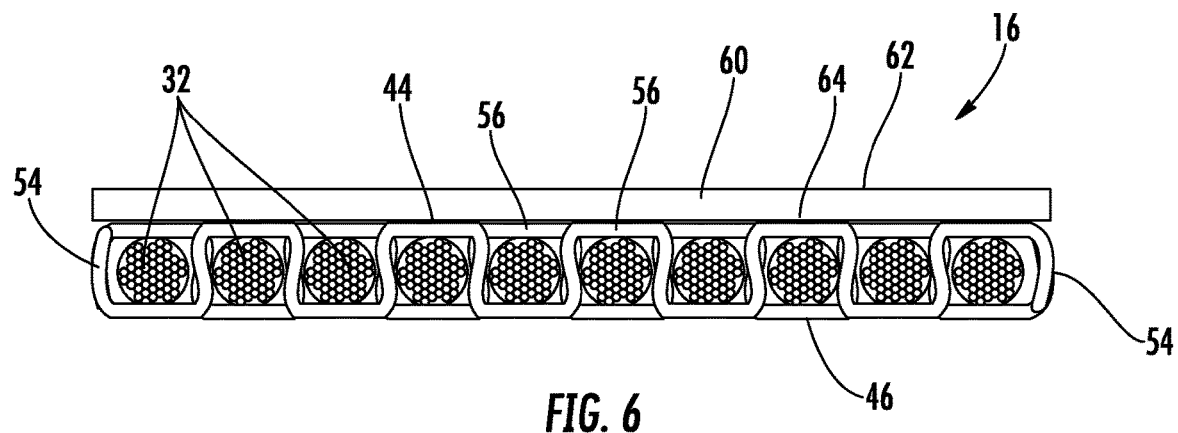
FIG. 6 is a cross-sectional view of another embodiment of an elevator belt having a laminate layer.

In another embodiment, as shown in FIG. 6, the binder layer 64 is not utilized, but the laminate material layer 60 is fused directly to the yarns 56. This may be accomplished by utilizing yarns 56 having a fusible yarn material. Fusible yarns 56 can be of any thermoplastic or melt curable materials that have a melt/flow temperature lower than the surrounding fabric construction. This allows the fusible material to flow and infiltrate the fabric construction without compromising the skeletal nature of the fabric construction which holds the cords or tension elements 32 in position. Such fusible material may include nylon, polyurethane, polyvinyl chloride, polyester, polyethylene, polyvynilidine fluoride, hot melt adhesive, heat activated adhesives, or the like. Yarns 56 may also be constructed where only a portion of the fibers or materials in the yarn 56 are of a fusible nature and the remainder of the fibers are of a similar higher melting material such as the material that makes up the fabric construction. Alternatively, the laminate material layer 60 may include a material which flows under controllable conditions to bind the laminate material layer 60 to the yarns 56 and/or to the tension elements 32.

The laminate material layers 60 should have appropriate coating systems applied to them before, during, and/or after the lamination process as needed to provide the appropriate properties, such as traction performance, for example. The coating package or packages should impart durability to the final construction against mechanical and environmental influences. Ultimately, the final construction of the laminate material layers 60 should be resistant to abrasion from the traction surface 62 and cut-tear from the tension elements 32. Fiber-fiber contact and movement should also be reduced to reduce fiber fraying. Additives such as carbon black, clay, and others may be used to impart environmental stability and acceptable traction performance. This includes providing sufficient traction to allow the load to be lifted while also having a low enough level of traction to ensure safe emergency braking and other required functions. The application of the coatings can be done in any number of ways including dip, spray, blade, resin transfer, pultrusion, etc.

Figure 7:
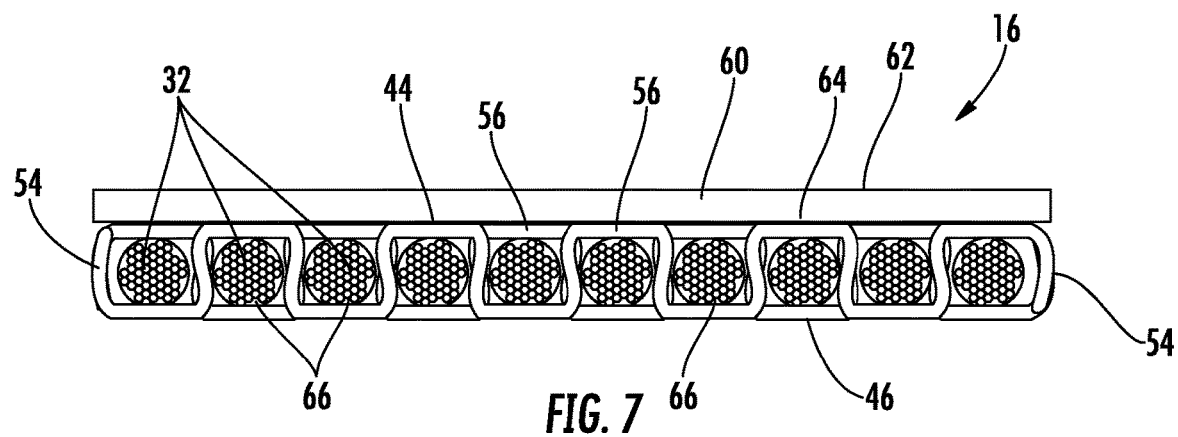
FIG. 7 is a cross-sectional view of an embodiment of an elevator belt having a cord sheath.

In another embodiment, such as shown in FIG. 7, the tension elements 32 are encapsulated in a cord sheath 66. The cord sheath 66 is formed from a thermoplastic material such as nylon or polyester, elastomeric thermoset materials, urethanes, elastomers, or fluoropolymers. During fabrication, the belt 16 is heated thus allowing the cord sheath 66 to flow, thus adhering to the yarns 56, the tension element 32 at which it is located, and also the other tension elements 32 thus consolidating the belt 16.

In other embodiments, the cord sheath 66 is utilized with the laminate material layer 60 at one or more of the traction side 44 or the back side 46. During fabrication of such embodiments, the belt 16 is heated to allow the cord sheath 66 to flow, the laminate material layer 60 is applied, and the cord sheath 66 material binds to the yarns 56 and to the laminate material layer 60. In such embodiments, it is desired that the cord sheath 66 have a melt temperature not greater than a melt temperature of the yarns 56 or of the laminate material layer 60. In further embodiments, the cord sheath 66 is melted under pressure and flows into any voids in the fabric, consolidating the belt 16 to the extent that the cord sheath 66 material defines the traction side 44 and/or the back side 46 of the belt 16 such that the laminate material layer 60 is unnecessary.

Figure 8:
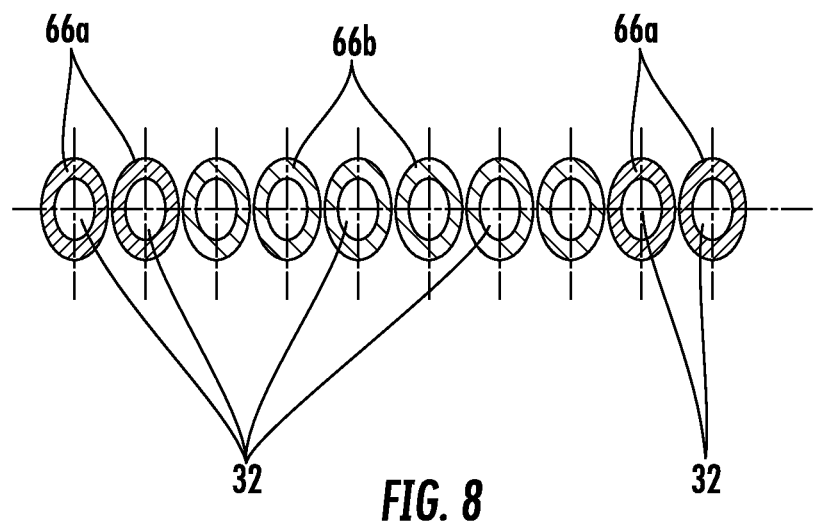
FIG. 8 is a cross-sectional view of another embodiment of an elevator belt having a cord sheath.
Figure 9:
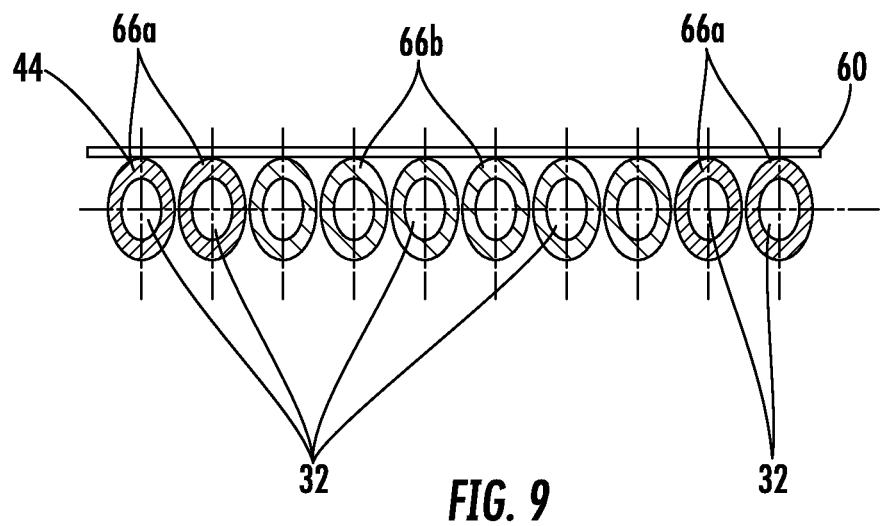
FIG. 9 is a cross-sectional view of yet another embodiment of an elevator belt having a cord sheath.
Figure 10:
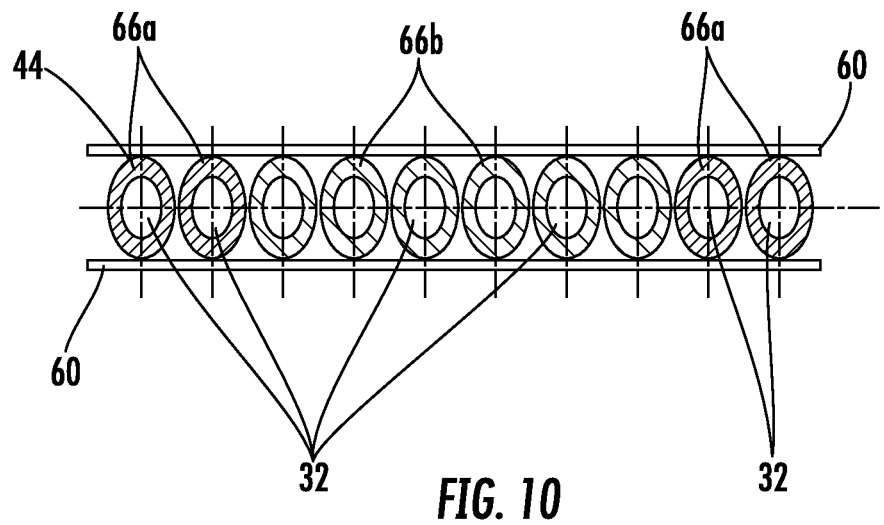
FIG. 10 is a cross-sectional view of still another embodiment of an elevator belt having a cord sheath.

In some embodiments, such as shown in FIG. 7, the cord sheath 66 utilized at each tension member 32 is identical, while in other embodiments, such as shown in FIGS. 8-10, cord sheaths 66 of different materials may be utilized depending on, for example, a lateral position of the tension member 32 in the belt 16. For example, as shown, the laterally outermost two edge tension members 32 on either lateral side of belt 16 can have a first cord sheath 66*a* formed from a first material, while the remaining tension members 32 have a second cord sheath 66*b* formed from a second material. In some embodiments, the first cord sheath 66*a* is configured to improve wear resistance of the belt 16, since in a belt 16 the edge tension members 32 are most susceptible to wear. The cord sheath 66*b* applied to the remaining tension members 32 may be configured to improve traction and/or reduce noise, since those tension members 32 dominate traction and noise performance.

Configurations of belt 16 having cord sheaths 66*a* and 66*b* may also be utilized with a laminate material layer 60 located at the traction side 44 as shown in FIG. 9, or on the back side 46. Additionally, in some embodiments, such as shown in FIG. 10, laminate material layers 60 may be utilized at both the traction side 44 and the back side 46. Further, while the cord sheath 66*a* described above is configured to improve wear resistance and cord sheath 66*b* is configured to improve traction and/or noise, additionally or alternatively, the cord sheathes 66*a* and 66*b* may be configured to improve other operational parameters of the belt 16, such as fire resistance.

The belt 16 according to the present disclosure has improved wear life through building up of the traction surface 62 thickness and evening out of the surface pressure profile. It provides the opportunity to utilize polymer films, polymer infiltrated fabric, and other unique materials. Further, it allows for the application of unique laminate material layers 60 to discrete portions of the belt 16, thus allowing for tuning of properties of, for example, the traction surface 62 relative to the back side 46 and/or belt edges 54. Additionally, the use of the cord sheath 66 and consolidating the belt 16 via flow of the cord sheath 66 during manufacture of the belt 16 improves durability performance of the belt 16 by reducing relative movement between components of the belt 16. While described in the context of an elevator system 10 herein, the belt 16 configurations disclosed may be utilized in other applications such as grain elevators, hoisting and strapping applications and moving walkway systems, or the like.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A traction-driven belt for movement of a load, comprising:
   a plurality of tension elements extending longitudinally along a length of the belt;
   a plurality of yarns interlaced with the plurality of tension elements forming a composite belt structure; and
   a laminate material layer comprising one or more of a woven fabric, a nonwoven fabric, a polymer film, a polymer-infiltrated fabric, or a carbon fiber composite, the laminate material layer being affixed to at least one surface of the composite belt structure to improve one or more performance properties of the composite belt structure;
   wherein a first tension element of the plurality of tension elements is enclosed in a first sheath formed from a first sheath material, and a second tension element of the plurality of tension elements is enclosed in a second sheath formed from a second sheath material different from the first sheath material, the second tension element not enclosed in the first sheath.

2. The belt of claim 1, wherein further comprising a binder layer interposed between the laminate material layer and the at least one surface to adhere the laminate material layer to the at least one surface.

3. The belt of claim 2, wherein the binder layer includes one or more of a thermoplastic urethane, a hot melt adhesive, a two-part urethane or a contact cement.

4. The belt of claim 1, wherein one or more of the plurality of yarns include a fusible material to bind the laminate material layer to the composite belt structure.

5. The belt of claim 4, wherein the yarns include a first yarn material which is fusible and a second yarn material which is not fusible.

6. The belt of claim 1, wherein the laminate material layer is affixed to a traction side of the composite belt structure.

7. The belt of claim 1, wherein the one or more performance properties includes traction, wear resistance or noise resistance.

8. A traction-driven belt for moving a load, comprising:
   a plurality of tension elements extending longitudinally along a length of the belt;
   a plurality of yarns interlaced with the plurality of tension elements forming a composite belt structure; and
   a sheath enclosing at least one tension element of the plurality of tension elements, the sheath formed from a flowable material to bind the tension element to the plurality of yarns, and/or adjacent tension elements;
   wherein a first tension element is enclosed in a first sheath formed from a first sheath material, and a second tension element is enclosed in a second sheath formed from a second sheath material different from the first sheath material, the second tension element not enclosed in the first sheath.

9. The belt of claim 8, wherein the sheath is configured to improve one or more of wear resistance, noise resistance, traction or fire performance of the belt.

10. The belt of claim 8, further comprising a laminate material layer affixed to at least one surface of the composite belt structure to improve one or more performance properties of the composite belt structure.

11. The belt of claim 10, further comprising a binder layer interposed between the laminate material layer and the at least one surface to adhere the laminate material layer to the at least one surface.

12. The belt of claim 10, wherein the laminate material layer includes one or more of a woven or nonwoven fabric, a polymer film, a polymer-infiltrated fabric, or a carbon fiber composite.

13. The belt of claim 10, wherein the laminate material layer is affixed to a traction side of the composite belt structure.

14. The belt of claim 8, wherein one or more of the plurality of yarns include a fusible material to improve adhesion in the belt.

15. The belt of claim 14, wherein the yarns include a first yarn material which is fusible and a second yarn material which is not fusible.

* * * * *